(12) United States Patent
Metso

(10) Patent No.: US 9,892,116 B2
(45) Date of Patent: Feb. 13, 2018

(54) ENCODING CONFIGURATION INFORMATION OF AN APPARATUS INTO AN OPTICAL CODE

(71) Applicant: ABB Oy, Helsinki (FI)

(72) Inventor: Vesa Metso, Helsinki (FI)

(73) Assignee: ABB Technology Oy, Helsinki (FI)

( * ) Notice: Subject to any disclaimer, the term of this patent is extended or adjusted under 35 U.S.C. 154(b) by 0 days.

(21) Appl. No.: 13/890,481

(22) Filed: May 9, 2013

(65) Prior Publication Data

US 2013/0299571 A1 Nov. 14, 2013

(30) Foreign Application Priority Data

May 9, 2012 (EP) ..................................... 12167325

(51) Int. Cl.
| | | |
|---|---|---|
| *G06F 17/30* | (2006.01) | |
| *G06K 7/10* | (2006.01) | |
| *G06K 17/00* | (2006.01) | |
| *G06K 19/06* | (2006.01) | |

(52) U.S. Cl.
CPC ............ *G06F 17/30* (2013.01); *G06K 7/1095* (2013.01); *G06K 17/0022* (2013.01); *G06K 19/06028* (2013.01); *G06K 19/06037* (2013.01); *G06K 2017/0093* (2013.01)

(58) Field of Classification Search
CPC ...... G06Q 50/22; B07C 7/005; B07C 5/3412; G06F 17/30; G06K 19/06037; G06K 19/06028; G06K 17/0022; G06K 7/1095; G06K 2017/0093
See application file for complete search history.

(56) References Cited

U.S. PATENT DOCUMENTS

| | | | |
|---|---|---|---|
| 2002/0151993 A1* | 10/2002 | Olesen ................ | H02P 23/0077 700/86 |
| 2005/0195537 A1* | 9/2005 | Virolainen ....................... | 361/18 |
| 2007/0229018 A1* | 10/2007 | Mitchell .............. | G01R 31/343 318/650 |
| 2009/0250512 A1 | 10/2009 | Deck et al. | |
| 2011/0007782 A1* | 1/2011 | Takahashi et al. ........... | 375/149 |
| 2011/0074629 A1* | 3/2011 | Khan et al. .............. | 342/357.64 |
| 2012/0154130 A1* | 6/2012 | Liu ........................... | 340/12.25 |

(Continued)

FOREIGN PATENT DOCUMENTS

| | | | |
|---|---|---|---|
| EP | 1 975 751 A1 | 10/2008 | |
| EP | 2 267 599 A1 | 12/2010 | |

(Continued)

OTHER PUBLICATIONS

Search Report dated Feb. 22, 2013, by the European Patent Office for Application No. 12167325.

(Continued)

*Primary Examiner* — Sonji Johnson
(74) *Attorney, Agent, or Firm* — Taft Stettinius & Hollister LLP

(57) ABSTRACT

An exemplary apparatus and method are provided in which the apparatus is provided with encoding configuration information as an optical code. The optical code is displayed on a display of the apparatus. The optical code can be read from the display and configuration information derived from the optical code is sent to a database of configured apparatuses.

1 Claim, 2 Drawing Sheets

(56) References Cited

U.S. PATENT DOCUMENTS

| | | | | | |
|---|---|---|---|---|---|
| 2013/0166969 | A1* | 6/2013 | Zhang | ................. | G06F 11/0772 |
| | | | | | 714/57 |
| 2013/0278780 | A1* | 10/2013 | Cazier | ................. | H04N 5/23222 |
| | | | | | 348/207.1 |
| 2014/0231504 | A1* | 8/2014 | DeRoos | ................. | G06Q 10/06 |
| | | | | | 235/375 |
| 2017/0165842 | A1* | 6/2017 | Jenkinson | .............. | B25J 9/1697 |

FOREIGN PATENT DOCUMENTS

| | | | |
|---|---|---|---|
| JP | 2007-041840 A | | 2/2007 |
| JP | 2008-065609 A | | 3/2008 |
| JP | 2008065609 A | * | 3/2008 |

OTHER PUBLICATIONS

"A method of providing error handling information of a ditital equipment using a two-dimensional bar code and a cellular phone", IP.com Journal, Apr. 2006.

* cited by examiner

ENCODING CONFIGURATION INFORMATION OF AN APPARATUS INTO AN OPTICAL CODE

RELATED APPLICATION(S)

This application claims priority under 35 U.S.C. § 119 to European application 12167325.5 filed in Europe on May 9, 2012, the entire content of which is hereby incorporated by reference in its entirety.

FIELD

The disclosure relates to optical codes, and more particularly to optical codes encoding configuration information.

BACKGROUND INFORMATION

Device manufacturers assign serial numbers to manufactured devices. The serial numbers are stored into a database, where information of a specific device can be stored later on, when the device is purchased by the customer and put into use. This information can include, for example, operational parameters of the device, location of deployment, or other information as desired.

The database can be updated with information of the manufactured devices via a web-interface. However, depending on the amount of information to be entered per each device, entering the information to the database can be a time-consuming task. In some cases, a fixed Internet connection to the database is not available or the connection to the database is slow, whereby the time specified for updating the database is increased or even prevented, when no connection to the database is available. Additionally, due to human error in entering the information, the information updated in the database can be erroneous.

SUMMARY

An exemplary method is disclosed comprising: reading an optical code from a frequency converter; deriving from the optical code configuration information of the frequency converter; and sending the configuration information to a database of configured frequency converters that have been installed.

An exemplary method is disclosed comprising: storing configuration information of a frequency converter; encoding the configuration information into an optical code; and displaying the optical code of the frequency converter on a display.

An exemplary apparatus is disclosed comprising: an optical code reader for reading optical codes; communications means for communicating with a database; and a control unit operatively coupled to the optical code reader and the communications means and configured to instruct the apparatus to: read an optical code from the frequency converter; derive from the optical code configuration information of the frequency converter; and send the configuration information to a database of configured frequency converters that have been installed.

An exemplary frequency converter is disclosed comprising: a memory for storing configuration information; a display for displaying optical codes; and a control unit operatively coupled to the memory and the display to instruct the frequency converter to: store configuration information of a frequency converter; encode the configuration information into an optical code; and display the optical code of the frequency converter on a display.

An exemplary non-transitory computer readable medium is disclosed that stores a computer program of instructions for executing a computer process in an apparatus, the instructions causing the apparatus to perform a method comprising: reading an optical code from a frequency converter; deriving from the optical code configuration information of the frequency converter; and sending the configuration information to a database of configured frequency converters that have been installed.

An exemplary non-transitory computer readable medium is disclosed that stores a computer program of instructions for executing a computer process in a frequency converter, the instructions causing the frequency converter to perform a method comprising: storing configuration information of the frequency converter; encoding the configuration information into an optical code; and displaying the optical code of the frequency converter on a display.

BRIEF DESCRIPTION OF THE DRAWINGS

In the following the disclosure will be described in greater detail by way of exemplary embodiments with reference to the attached drawings, in which.

DETAILED DESCRIPTION

Figure 1:
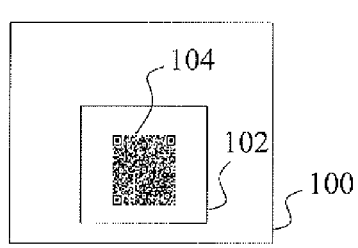
FIG. 1 illustrates an apparatus provided with optical code encoding configuration information according to an exemplary embodiment.

Exemplary embodiments of the project disclosure are directed to a method including reading an optical code from an apparatus, deriving from the optical code configuration information of the apparatus, and sending the configuration information to a database of configured apparatuses.

Other exemplary embodiments are directed to a method including storing configuration information of an apparatus, encoding the configuration information into an optical code, and displaying the optical code of the apparatus on a display.

An exemplary embodiment of the present disclosure is directed to an apparatus arranged to perform a method according to an exemplary aspect of the embodiment disclosure herein.

Another exemplary embodiment of the present disclosure is directed to an apparatus configured to perform a method according to an aspect.

Exemplary embodiments of the present disclosure are directed to an apparatus according to an aspect that includes (e.g., comprises) a drive system, a frequency converter or an optical code reader.

In another exemplary embodiment of the present disclosure, a computer program product is provided that includes program instructions which, when loaded into an apparatus, cause the apparatus to perform a method according to an exemplary aspect of the embodiment disclosed herein.

Exemplary embodiments provide improvements including a reduced time of updating a database with information of configured apparatuses.

Exemplary embodiments also provide improvements including reduced errors in updating a database with information of configured apparatuses.

In the exemplary embodiments disclosed herein, an optical code encodes source information into a graphical representation. The graphical representation is visible to the human eye as a signal on a portion of the electromagnetic spectrum visible to the human eye. The range of electromagnetic spectrum visible to the human eye includes the frequencies of the electromagnetic spectrum above the infrared frequencies and below the ultraviolet frequencies, thus the portion of spectrum between 790 and 400 THz, thus the wavelengths from 380 nm to 760 nm.

In the exemplary embodiments of the present disclosure, the encoding of the source information into a graphical presentation can be performed according to a symbology that defines a mapping between the source information and a target symbol, e.g., the optical code. The source information can include (e.g., comprise) alphanumerical characters. The target symbol can be a symbol encoding information in one or more dimensions. The target symbol can be a black and white symbol or a symbol with any number of colors of the electromagnetic spectrum visible to the human eye. The frequency ranges and corresponding wavelengths of each color are well-known to a skilled person and therefore, will not be explained herein.

In the exemplary embodiments, an optical code can encode data in one dimension, or more dimensions, e.g. 2, 3, 4 . . . N dimensions.

Optical codes that encode source data in one dimension can include parallel lines and spaces. The source data is encoded by varying the width of the lines and spaces. When more dimensions are used to encode the source data, more complex geometrical forms of optical codes are used, for example, rectangles, dots, or hexagons.

Bar codes are one example of optical symbols. The bar codes can be classified by the number of dimensions they use to encode data, one dimensional (1D) bar codes, and two dimensional (2D) bar codes. The more dimensions are used for encoding data the more data can be represented by the bar code per unit area. The 1D-bar codes use the parallel lines as explained above, for encoding source data. The 2D-bar codes encode the data into black and white pixels whose width is used to encode the source data.

It should be appreciated that also colors can be used in optical codes to increase the dimensions of encoding the optical codes and/or to facilitate readability of the codes in different environments of use. By using a specific color limited to a portion of the electromagnetic spectrum visible to the human eye, improved contrast of the optical codes can be provided to facilitate readability of the optical codes. It should be appreciated that if the colors used to encode an optical code correspond with only a part of the electromagnetic spectrum, optical code readers and/or display devices used to display the optical codes can be optimized to operate only on the limited region of the electromagnetic spectrum that corresponds with the colors used to encode the optical codes. In this way the more simple devices can be used which can provide cost-efficiency when implementing the exemplary embodiments.

One example of a 2D-bar code includes a Quick Response (QR) code.

FIG. 1 illustrates an apparatus provided with optical code encoding configuration information according to an exemplary embodiment. As shown in FIG. 1, the apparatus 100 includes a display 102, where the optical code is displayed. The display can include, e.g., a Liquid Crystal Display (LCD) or a Light-Emitting Diode Display (LED), for example. The display can be a touchscreen display to receive commands from a user.

In an exemplary embodiment disclosed herein, the apparatus 100 can include a product of manufacture. The product can be an industrial product, e.g., a drive system or a frequency converter. The product can also be a consumer product, e.g., a mobile phone, a household appliance, or an optical code reader.

When the apparatus 100 is deployed into use in an exemplary environment it can be subject to conditions, e.g. dirt, which can make it difficult to read any information that is provided on the apparatus and/or on a display provided with the apparatus. The information provided on the apparatus 100 can include configuration information that is specific to the apparatus. The configuration information can include static information and/or dynamic information.

In an exemplary embodiment of the present disclosure, the configuration information provided on the apparatus corresponds to a data record linked to the configured apparatus at a database of configured apparatuses. Accordingly, configured apparatuses can be managed by maintaining a database including configuration information of each configured apparatus.

In an exemplary embodiment, the static configuration information can comprise an identifier of the apparatus. The identifier of the apparatus can include a serial number of the apparatus for identifying the apparatus, batch of manufactured apparatuses and/or a type of the apparatus. The identifier can be assigned by the manufacturer as a part of the manufacturing process.

For example, an identifier of the apparatus according to an exemplary embodiment comprises an International Mobile Equipment Identifier (IMEI) that is used to uniquely identify apparatuses, e.g. mobile phones, in cellular communications networks.

In another exemplary embodiment, the static configuration information can comprise an address of the apparatus. The address can be e.g. a network address, such as an Ethernet MAC (Medium Access Control) address, Internet Protocol (IP) address, or a World Wide Web (WWW) Uniform Resource Locator (URL) address.

In an exemplary embodiment, the dynamic configuration information can comprise operational parameters of the apparatus. The operational parameters can include operational values measured from the apparatus while operating and/or warning/fault codes, to name a few. The dynamic configuration information can change by during the use of the apparatus. The changes can be caused by a user of the apparatus making changes to the dynamic configuration information or by the dynamic configuration information being updated automatically during the use of the apparatus.

In an exemplary embodiment, the apparatus 100 comprises a motor drive, the dynamic information can comprise information about operations of the motor, including torque, speed, output frequency, input power, output power, motor current, to name a few.

It should be appreciated that the static and/or dynamic information provided on the apparatus 100 can comprise a combination of one or more examples of static information provided above.

In an exemplary embodiment, the static information comprises an address of a database of configured apparatuses. The database can be managed by the manufacturer of the apparatuses for registering the apparatuses. Such a database facilitates also providing maintenance services to the manufactured apparatuses.

Figure 2:
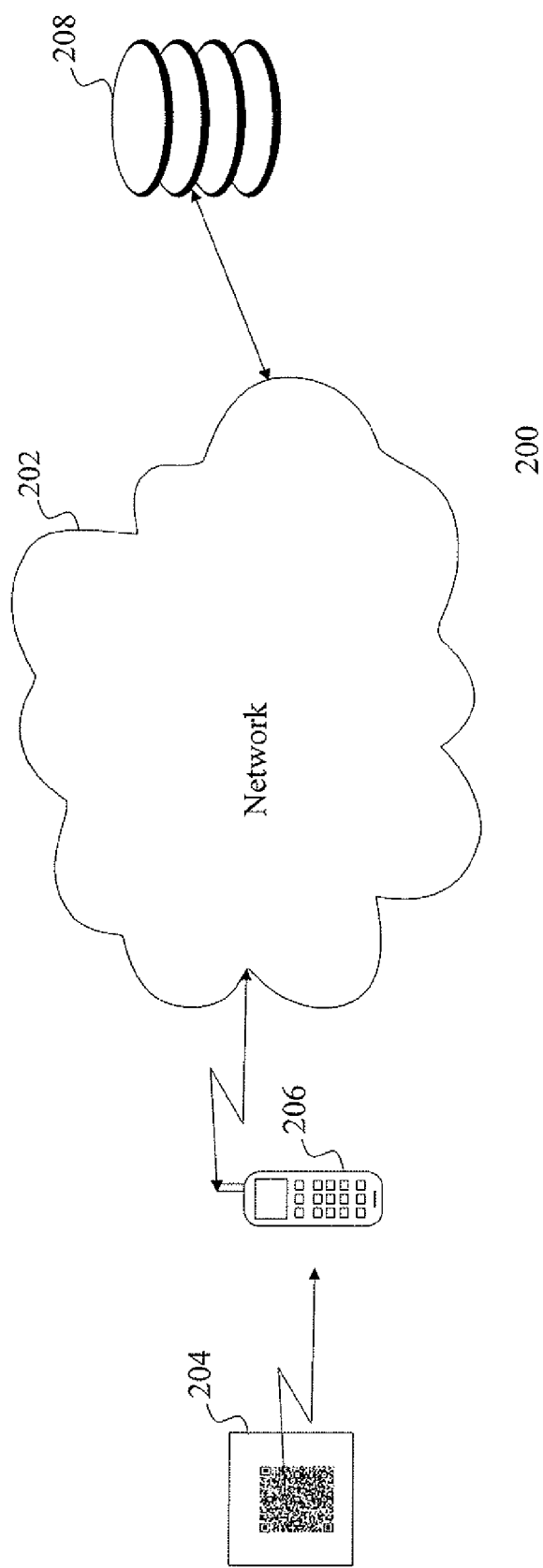
FIG. 2 illustrates architecture for managing configured apparatuses according to an exemplary embodiment.

FIG. 2 illustrates architecture for managing configured apparatuses according to an exemplary embodiment. The managing of configured apparatuses is implemented by maintaining database 208 of configured apparatuses, where configuration information can be stored and updated. The configured apparatus 204 is provided with an optical code encoding configuration information of the apparatus. The optical code can be provided on a housing of the apparatus or on a display as illustrated in FIG. 1.

As shown in FIG. 2, an apparatus 206 reads by optical reading means, e.g. a camera, the optical code on the configured apparatus 204. Accordingly, the apparatus 206 operates as an optical code reader. The information derived from the optical code, such as static and/or dynamic configuration information can be sent to a database 208 by employing communications means (e.g., unit or module) of the apparatus 206. The database is provided with communications means to receive the configuration information from the optical code reader 206. The communications between the database and the optical code reader can be provided via a communications network 202. It should be appreciated that also a direct connection without involvement of the network can be possible. The communications between the database and the optical code reader can comprise one or more wired or wireless connections.

In exemplary embodiment, the communications between the optical code reader and the database can include a wired or wireless connection. The connection can be established on-demand or the connection can be always on. The connection can be a packet-based connection or a circuit switched connection.

In another exemplary embodiment, the optical code reader communicates with the database via wireless connection provided by a mobile communications network e.g. GSM (Global System for Mobile Communications), 3G (3rd Generation mobile communications) or 4G (4th Generation mobile communications) network, or by a wireless Access Point, e.g. a Wireless Local Area Network (WLAN) AP conforming to the IEEE 802.11 family of standards.

In yet another exemplary embodiment disclosed herein, the optical code reader communicates with the database via wired connection comprising e.g. an Ethernet and/or an IP connection.

The database 208 can be connected to the optical code reader via a network of the manufacturer of the configured apparatus 204. The connection of the database to the optical code reader can use the same types of connection as explained above for the optical code reader. However, in implementations according to an embodiment, where the optical reader and the database are not connected over a direct connection, the optical code reader and the database can employ different types of connections to a connecting network.

Figure 3:
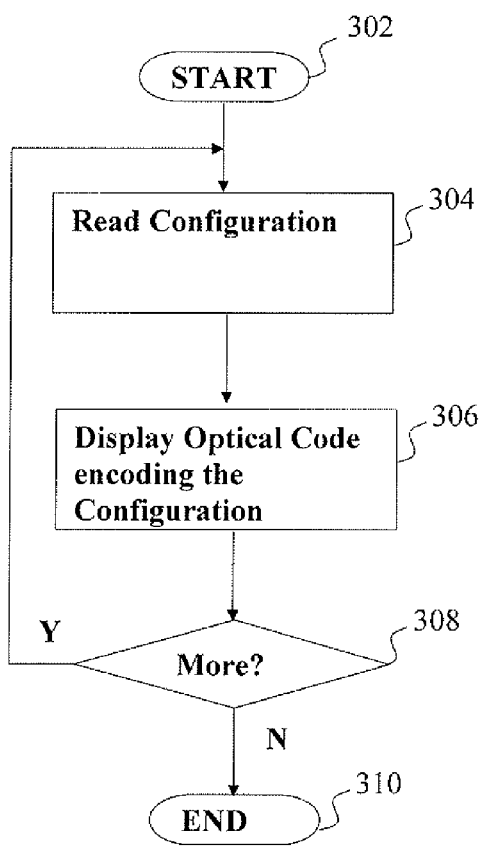
FIG. 3 illustrates a method of providing configuration information according to an exemplary embodiment.

FIG. 3 illustrates a method of providing configuration information according to an exemplary embodiment. The method can be performed by a configured apparatus provided with an optical code encoding configuration information of the apparatus, as illustrated in FIG. 1. Examples of the configured apparatus are also described in FIGS. 2 and 5. The process of FIG. 3 provides the configuration information by displaying the optical code encoding configuration information of the apparatus in a machine-readable format. Providing the configuration information in a machine-readable format enables reading the configuration information directly by a machine, e.g. an optical code reader. In this manner, human involvement in the transfer of the configuration information can be minimized, thereby also reducing the possibility of human error. When error correction and/or detection is used in encoding the configuration information into one or more optical codes, reading of the configuration information correctly can be facilitated in challenging use environments, e.g., where the optical code is totally or partially obstructed by dirt of damaged. Then, after the optical code is read, it can be provided to a database, stored or viewed on a display hosted e.g. by the optical code reader.

The method of FIG. 3 starts in 302, where an apparatus is configured with configuration information.

In 304, the configuration information is read from a storage device e.g. a memory, connected to the configured apparatus.

In 306 an optical code encoding the configuration information is displayed. The optical code can be encoded from the configuration information read in 304. The encoding can comprise forming the optical code using a selected specific symbology associated with a type of optical codes. In an exemplary embodiment, the optical code comprises a QR code, whereby the symbology of the QR code is used in encoding the configuration information. After the optical code has been encoded from the configuration information, the optical code can be displayed. The displaying can comprise feeding the optical code as input to a display connected to the apparatus so as to display the configuration information as an optical code.

In an exemplary embodiment of the present disclosure, configuration information of the configured apparatus can be displayed as encoded into more than one optical code. The optical code can comprise static and/or dynamic configuration information. In another exemplary embodiment, static and dynamical configuration information can be encoded into separate optical codes. This facilitates, for example, generating optical codes including dynamical configuration information only when specified, whereby the optical code does not have to be re-generated every time the dynamic configuration information changes.

In another exemplary embodiment of the present disclosure, an optical code can include the following example information provided in a table for clarity:

TABLE 1

| Configuration Information | Example | Length in characters |
|---|---|---|
| Database address | http://www.abb.com/installedbase | 32 |
| Type code | ACS880-01-02A4-3 | 16 |
| Serial number | W1134C1200 | 16 |
| Operational parameters | Up to 30 different parameters | 270 |
| Checksum | CRC16 | 2 |
| Sum | | 336 |

When an optical code comprising the above information is decoded, a network address can be formed from the decoded information:

http://www.abb.com/installedbase ACS880-01-02A4-3_W1134C1200_99060024_99070400_99080050_99091480_9910015.

Accordingly, the fields of different configuration information encoded into an optical code can be combined in decoding the optical code into a network address.

If, in 308, more than one code is used to display configuration information of the configured apparatus, the method can return to step 304, where further optical codes can be generated and displayed by execution of the steps 304 and 306 by the configured apparatus.

In an exemplary embodiment, where configuration information is encoded to an optical code, the optical code can be stored in a memory of the configured apparatus. This can be performed during manufacturing of the device for the configuration information comprises static information. Also, optical codes encoding dynamic configuration information can be stored to be displayed afterwards. Accordingly, it should be appreciated that in the process explained in FIG. 3, reading of the configuration information should not be necessary, if an optical code or optical codes encoding the configuration information of the configured apparatus are already stored generated and stored in the apparatus.

An exemplary embodiment of the present disclosure provides that the configuration information displayed in 306 can be in response to a command from the user to display the configuration information. The command of the user can indicate the type of configuration information requested.

In an exemplary embodiment, a command can be received form a user of the configured apparatus to display all the configuration information as one or more optical codes.

In still another exemplary embodiment, a command can be received from the user to display only a part of the configuration information of the configured apparatus. When the user requested configuration information is generated into optical codes by execution of the steps 304 to 306, no more optical codes should be displayed and the process can end in 310.

When the amount of configuration information of the apparatus or requested by the user, exceeds a capacity of a single optical code to encode configuration information, more 308 optical codes should be displayed, and the process proceeds to 304.

In an embodiment more than none optical codes can be displayed simultaneously or at different times on a display of the configured apparatus. The displaying can be performed based on a command received from the user. In some instances, it can be possible to display all the optical codes in a single view since the number of optical codes can be high depending on the amount of configuration information. Therefore, all the optical codes may not fit into the display and the optical codes should be displayed at separate times.

In an embodiment, described herein where the configuration information includes static and dynamic information, the optical codes encoding static and dynamic configuration information can be displayed in different view on the display. Since not all the configuration information is needed, displaying only a part of the optical codes, encoding static or dynamic configuration information facilitates displaying only the specified information.

In another exemplary embodiment, a plurality of optical codes can be displayed in a sequence. The sequence can comprise displaying the optical codes in two or more separate views on the display and/or displaying the optical codes in a single view on the display. When display on a single view the optical codes can be arranged in a sequence on the view, where the sequence progresses in rows and/or columns. If the physical limits of the display do not provide for viewing all the optical codes at a time, the view can be extended beyond the physical limits and the optical codes within the view can be shown my scrolling the view displayed by the physical display.

Figure 4:
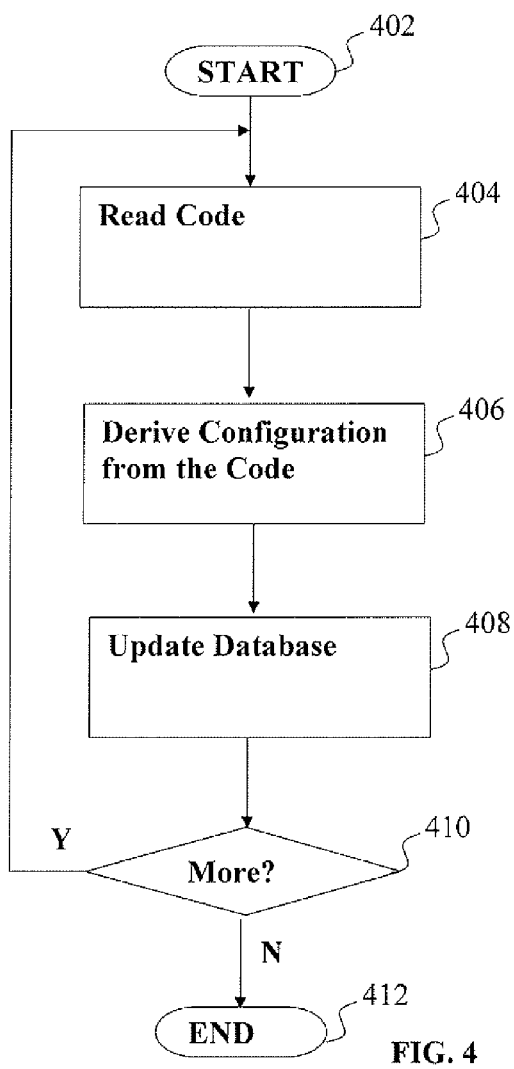
FIG. 4 illustrates a method of updating a database of configured apparatuses according to an exemplary embodiment.

FIG. 4 illustrates a method of updating a database of configured apparatuses according to an exemplary embodiment. The process can be performed by an apparatus equipped with an optical code reader and communications means (e.g., unit or module) for connecting to a database of configured apparatuses. Examples of the apparatuses are described with FIG. 5 and FIG. 2. In the process of FIG. 4, configuration information from an apparatus is read as one or more optical codes. The configuration information derived from the optical codes is then sent to the database of configured apparatuses. In this manner, machine to machine information transfer of the configuration of the apparatus can be performed with minimal human involvement in the transferred information, whereby human errors in the information transfer can be avoided. Also, with minimal human involvement, the information transfer can be made fast.

The method starts in 402, where an optical code to be read is visible to optical reading means of an optical code reader. Thus, the optical code to be read need not be visible for the entire optical code reader but only to the part of the optical code reader that receives light from optical codes. In an embodiment the reading means can include, e.g., a camera.

In 404 the optical code reader reads the optical code from an apparatus. The reading can comprise receiving a signal, e.g., light, to the reading means of the optical code reader. The received signal can comprise a portion of the electromagnetic spectrum visible to the human eye. This portion of the electromagnetic spectrum includes the frequencies of the electromagnetic spectrum above the infrared frequencies and below the ultraviolet frequencies, thus the portion of spectrum between 790 and 400 THz, thus the wavelengths from 380 nm to 760 nm. By employing the optical codes, the configuration information can be transferred wirelessly to the optical code reader. Since the optical code is read by the optical code reader, there is minimal possibility for human errors in reading the configuration information.

In 406 the optical code is decoded. The decoding operates according to the same symbology as used for encoding in the configured apparatus. By decoding the optical code, the configuration information used in encoding the optical code can be derived. The configuration information can include alphanumerical information.

In 408, a database of configured apparatuses is updated. The updating can comprise sending the configuration information derived in 406 to the database of configured apparatuses.

In an exemplary embodiment, the address of the database of configured apparatuses can be obtained from decoding 406 the optical code read in 404. This address can be, for example, "http://www.abb.com/installedbase" as in Table 1. In this manner, the address of the database to be updated can be provided by the configured apparatus to the optical code reader and the optical code reader should not have to obtain information about the database, where the configuration information read in 406 should be updated.

It should be appreciated that the optical code read in 404 is not specified in all instances to include the address of the database or the database address read from the optical code can be disregarded. The address of the database can be pre-stored in the optical code reader, e.g., as a bookmark, or provided by the user of the optical code reader. In this manner, any changes of the address of the database should not affect the updating 408, since the optical code reader uses the pre-stored or user-entered database address. This can be advantageous if the database address obtained from the optical code is outdated.

In an exemplary embodiment, the updating 408 can include combining the configuration information derived in 406 into a network address. Examples of the configuration information and a corresponding network address, WWW URL, can be as described above with Table 1. In this manner, the database can receive the configuration information directly from the WWW URL and the configuration information can be updated.

In another exemplary embodiment, the optical code read in 404 includes static and/or dynamic configuration information.

If in 410 configuration information of the configured apparatus exceeds the capacity of the optical code to encode data in a single code, more codes can be read to receive all the configuration information from the configured apparatus and the process can proceed to 404 to read further codes. Otherwise, the process can end in 412 after the database has been updated with configuration information derived from one or more optical codes.

In an exemplary embodiment, a plurality of optical codes can be read by the execution of steps 404 to 406. For example, one optical code can include at least an address of the database and further optical codes include at least one of an operational parameter of the configured apparatus and an identifier of the configured apparatus. By separating the configuration information into different codes, the data encoded per each optical code can be limited.

In an another exemplary embodiment, a plurality of optical codes can be read by the execution of steps 404 to 406, where static and dynamic configuration information is encoded into separate optical codes. By separating the static and dynamic configuration information into separate optical codes, unnecessary reading of configuration information can be avoided, for example, when the configuration information is already updated to the database or there is not yet dynamic configuration information available.

In an exemplary embodiment of the present disclosure, in the method of updating a database of configured apparatuses illustrated in FIG. 4, the step of updating database 408 is performed after a connection to the database is available. Accordingly, one or more optical codes can be read by execution of the steps 404 to 406 in the process of FIG. 4, and the information derived from the optical codes can be stored until a connection to the database is available.

When the connection to the database is available, the configuration information derived from the optical codes can be sent to the database in 408. In an exemplary embodiment of the present disclosure, the connection can include a connection to a cellular communications network, whereby the availability of the connection depends on availability of the coverage of the cellular communications network. In another exemplary embodiment, the connection to the database can be a wired connection, e.g., Ethernet, whereby the optical code reader performs the step 408 of FIG. 4, when the wired connection is provided by connecting cable.

In yet another exemplary embodiment, the configuration information read from a one or more of optical codes by the steps 404 to 406 are combined into a single network address, e.g., WWW URL. In this way (Hyper Text Transfer Protocol) message, e.g., HTTP Request, is sent 408 by the optical code reader to the database.

In an embodiment disclosed herein, the process of FIG. 4 is performed by an optical code reader that is a handheld device and equipped with wireless communications means, e.g., 3G, 2G or WLAN. When the optical code reader is used to read an optical code of a configured apparatus, the connection to the database of configured apparatuses should not be available, for example, when the configured apparatus is located in premises where there is no coverage of a wireless communications network used by the handheld optical code reader to communicate with the database of configured apparatuses. However, when the optical code reader is moved, for example, by a person, away from such premises where there is no coverage to an area where coverage is provide by the wireless communications network, the optical code reader can connect the wireless communications network and the database can be updated as described with step 408 above.

It should be appreciated that the communications means of the handheld apparatus can also comprise any other communications means such as wired communications means, e.g., Ethernet connection, whereby the database of configured apparatuses can be updated as described above when the optical code reader is connected to a cable connecting the connection to the database of configured apparatuses.

In an exemplary embodiment, configuration information can be provided in a plurality of optical codes, where static and dynamic configuration information is encoded in separate optical codes for example using the process of FIG. 3. Since the static and dynamic information are encoded in separate optical codes, it is possible for an optical code reader executing the process of FIG. 4, to read only a part of the configuration information, thus either the dynamic or the static part. In this way, unnecessary reading of configuration information can be avoided. Reading the static information can be unnecessary, for example, when the static information of the configured apparatus is already updated to the database. Reading the dynamic information can be unnecessary, for example, when there is not yet any dynamic information of the apparatus available, which can be the case when the apparatus is only being deployed at a customer's premises, but is not yet operational.

Figure 5:
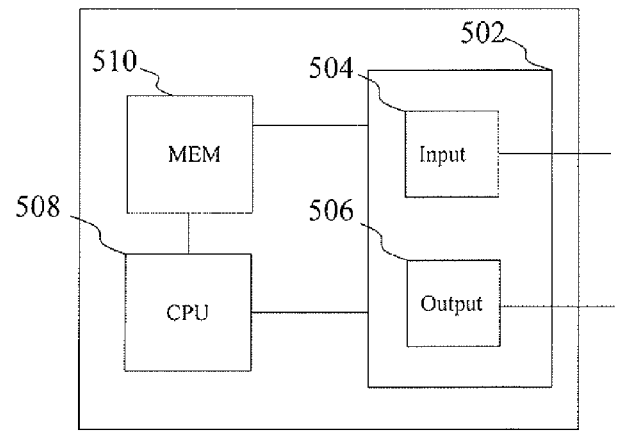
FIG. 5 is a block diagram of an apparatus according to an exemplary embodiment.

FIG. 5 is a block diagram of an apparatus according to an exemplary embodiment. The apparatus 500 can include a drive system, a frequency converter or an optical code reader described in the exemplary embodiments of the present disclosure. Although the apparatus 500 has been depicted as one entity, different modules and memory can be implemented in one or more physical or logical entities.

According to exemplary embodiments of the present disclosure, where the apparatus communicates with a communications network or a database, the apparatus can operate as a terminal suitable for operating as a termination point for telecommunication sessions. Examples of the terminal include but are not limited to user equipment (UE), a mobile phone, communicator, PDA, application server or a computer.

Accordingly, an apparatus according to an embodiment can operate both as an optical coder reader and as a terminal and implement functionality of both an optical coder reader and a terminal. In this manner, the configuration information derived from one or more optical codes read by the apparatus can be communicated to a database of configured apparatuses by the terminal functionality of the apparatus.

The apparatus 500 includes (e.g., comprises) an interfacing unit 502, a central processing unit (CPU) 508, and a memory 510, that are all being electrically interconnected. The interfacing unit comprises an input 504 and an output unit 506 that provide, respectively, the input and output interfaces to the apparatus. The memory can comprise one or more applications that are executable by the CPU. The input and output units can be configured or arranged to send and receive data, optical codes and/or messages according to one or more protocols used in the above-mentioned communication standards and symbologies.

In an exemplary embodiment of the present disclosure the input unit can provide circuitry for obtaining data, signaling, signaling messages, transmissions, commands and/or optical codes to the apparatus. The obtaining can comprise receiving radio frequency signals by an antenna, for example. In another example, the obtaining by the input unit can comprise receiving an optical code by an optical code reader. In yet another example, the obtaining can comprise receiving commands from a user via a user input device including one or more of a keyboard, computer mouse and/or a touch screen.

In an exemplary embodiment of the present disclosure the output unit can provide circuitry for transmitting data, signaling, signaling messages, transmissions and/or optical codes from the apparatus. The transmitting can comprise transmitting radio frequency signals by an antenna, for example. In another example, the transmitting can comprise transmitting an optical code by displaying the optical code on a display capable of displaying the code on the portion of electromagnetic spectrum visible to the human eye.

In another exemplary embodiment, the interfacing unit can comprise a display for displaying configuration information as one or more optical codes. The display can be a touchscreen that can detect the presence and location of a touch within the display area. The touching can be provided by human touch or by a device mediating the human touch, e.g., a stylus. Accordingly, a touchscreen can provide receiving the commands from a user and displaying configuration information in response to the command from the user.

The CPU can include a set of registers, an arithmetic logic unit, and a control unit. The control unit is controlled by a sequence of program instructions transferred to the CPU from the memory. The control unit can contain a number of microinstructions for basic operations. The implementation of micro-instructions can vary, depending on the CPU design. The program instructions can be coded by a programming language, which can be a high-level programming language, such as C, Java, etc., or a low-level programming language, such as a machine language, or an assembler. The electronic digital computer can also have an operating system, which can provide system services to a computer program written with the program instructions. The memory can be a volatile or a non-volatile memory, for example EEPROM, ROM, PROM, RAM, DRAM, SRAM, firmware, programmable logic, etc.

An exemplary embodiment disclosed provides a computer program embodied on a non-transitory distribution (e.g., computer-readable) medium, including program instructions which, when loaded into an electronic apparatus, cause the CPU to perform according to an embodiment of the present disclosure.

The computer program can be in source code form, object code form, or in some intermediate form, and it can be stored in some sort of carrier, which can be any entity or device capable of carrying the program. Such carriers include a record medium, computer memory, read-only memory, electrical carrier signal, telecommunications signal, and software distribution package, for example. Depending on the processing power needed, the computer program can be executed in a single electronic digital computer or it can be distributed amongst a number of computers.

The apparatus 500 can be implemented as an electronic digital computer, which can include a working memory (RAM), a central processing unit (CPU), and a system clock. The CPU can comprise a set of registers, an arithmetic logic unit, and a control unit. The control unit can be controlled by a sequence of program instructions transferred to the CPU from the RAM. The control unit can contain a number of microinstructions for basic operations. The implementation of microinstructions can vary, depending on the CPU design. The program instructions can be coded by a programming language, which can be a high-level programming language, such as C, Java, etc., or a low-level programming language, such as a machine language, or an assembler. The electronic digital computer can also have an operating system, which can provide system services to a computer program written with the program instructions.

An exemplary embodiment provides a computer program embodied on a distribution medium, including program instructions which, when loaded into an electronic apparatus, cause the execution of a method according to an embodiment.

The computer program can be in source code form, object code form, or in some intermediate form, and it can be stored in some sort of carrier, which can be any entity or device capable of carrying the program. Such carriers include a record medium, computer memory, read-only memory, electrical carrier signal, telecommunications signal, and software distribution package, for example. Depending on the processing power needed, the computer program can be executed in a single electronic digital computer or it can be distributed amongst a number of computers.

The exemplary apparatus according to an embodiment of the present disclosure include one or more integrated circuits, such as application-specific integrated circuits ASIC. Other hardware exemplary embodiments are also feasible, such as a circuit built of separate logic components. A hybrid of these different implementations is also feasible. When selecting the method of implementation, a person skilled in the art will consider the specifications set for the size and power consumption of the apparatus 500, necessary processing capacity, production costs, and production volumes, for example.

The exemplary apparatus according to an embodiment can also be a user terminal which is a piece of equipment or a device that associates, or is arranged to associate, the user terminal and its user with a subscription and allows a user to interact with a communications system. The user terminal presents information to the user and allows the user to input information. In other words, the user terminal can be any terminal capable of receiving information from and/or transmitting information to the network, connectable to the network wirelessly or via a fixed connection. Examples of the user terminal include a personal computer, a game console, a laptop (a notebook), a personal digital assistant, a tablet computer, a mobile station (mobile phone), and a line telephone.

Exemplary apparatuses of the present disclosure, such as an optical code readers and/or other corresponding devices or apparatuses implementing the functionality of a corresponding apparatus described with an embodiment comprise not only known means, but also means for reading an optical code from an apparatus, means for deriving from the optical code configuration information of the apparatus, and means for sending the configuration information to a database of configured apparatuses. In addition, they can comprise means for reading a plurality of optical codes comprising at least one optical code including static configuration information and one or more optical codes including dynamic configuration information.

Exemplary apparatuses disclosed herein, such as a drive system or a frequency converter and/or other corresponding devices or apparatuses implementing the functionality of a corresponding apparatus described with an embodiment of the present disclosure include not only known components, but also means, e.g., memory for storing configuration information of an apparatus, encoding the configuration information into an optical code, and means (e.g., processor) for displaying the optical code of the apparatus on a display. In addition, these apparatuses can include means (e.g., an encoder) for encoding configuration information of an apparatus into a plurality of optical codes, and means (e.g., processor) for displaying the plurality of optical codes as a sequence on a display.

More precisely, the apparatuses described with an embodiment can include means, e.g., a processor, for implementing functionality of a corresponding apparatus described with an embodiment and they can include separate means (e.g., processor) for each separate function, or means (e.g., processor) can be configured to perform two or more functions. Exemplary apparatuses can include processors and memory that can be utilized in an embodiment described herein. Programs, also called program products, including software routines, applets and macros, can be stored in any apparatus-readable data storage medium and they include program instructions to perform specified tasks. All modifications and configurations specified for implementing functionality of an embodiment can be performed as routines, which can be implemented as added or updated software routines, application circuits (ASIC) and/or programmable circuits. Further, software routines can be downloaded into an apparatus. The apparatus, such as a drive system or a frequency converter or an optical code reader, or a corresponding component, can be configured as a computer or a microprocessor, such as single-chip computer element, including at least a memory for providing storage area used for arithmetic operation and an operation processor for executing the arithmetic operation. An example of the operation processor includes a central processing unit. The memory can be removable memory detachably connected to the apparatus.

The present disclosure is applicable to any a drive system or a frequency converter or an optical coder reader, that operate on optical codes encoding configuration information. The steps/points, signaling messages and related functions described above in FIGS. 3 and 4 are in no absolute chronological order, and some of the steps/points can be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point. The operations of a drive system or a frequency converter or an optical coder illustrate a procedure that can be implemented in one or more physical or logical entities. The signaling messages are only exemplary and can even comprise several separate messages for transmitting the same information. In addition, the messages can also contain other information.

It should be appreciated that in some of the above described exemplary embodiments an optical code can be transmitted to the optical code reader also by other transmission means (e.g., circuit, component) than by optical means. Indeed various other transmission means (e.g., transmission component) can be used to transmit optical codes between the optical code reader and a configured apparatus, e.g., a frequency converter. These means (e.g., components) can include the communications means (e.g., circuit or module) described above for the optical code reader for communicating with a database, for example. Consequently, in those exemplary embodiments, displaying of the optical code can be optional since the transmission of the optical code to the optical reader takes place by another means, e.g., Bluetooth. Accordingly, a reception of an optical code transmitted to an optical code reader using other means than optical means, can be considered as reading the optical code.

Thus, it will be appreciated by those skilled in the art that the present invention can be embodied in other specific forms without departing from the spirit or essential characteristics thereof. The presently disclosed exemplary embodiments are therefore considered in all respects to be illustrative and not restrictive. The scope of the invention is indicated by the appended claims rather than the foregoing description and all changes that come within the meaning and range and equivalence thereof are intended to be embraced therein.

What is claimed is:

1. A frequency converter configured for use in an industrial drive system, comprising:
   a memory configured to store configuration information corresponding to a data record linked to the configured frequency converter at a database of configured frequency converters, wherein the configuration information includes operational parameters and an address of a location in the database of configured frequency converters;
   a display configured to display optical codes; and
   a control unit of the frequency converter of the industrial drive system operatively coupled to the memory and the display configured to instruct the frequency converter of the industrial drive system to:
      store configuration information of the frequency converter of the industrial drive system;
      encode the configuration information into a plurality of optical codes comprising at least one of a bar code, a matrix barcode, a 2D-bar code, and a Quick Response code, wherein at least one optical code includes static configuration information and one or more optical codes includes dynamic configuration information, a first optical code including at least the address of the location in the database and one or more second optical codes including at least operational parameters of the configured frequency converter, at least one of the optical codes including an identifier of the frequency converter; and
      display the plurality of optical codes of the frequency converter on the display.

* * * * *